US007302335B1

(12) United States Patent
Xiao

(10) Patent No.: US 7,302,335 B1
(45) Date of Patent: Nov. 27, 2007

(54) METHOD FOR DYNAMIC MASS AIR FLOW SENSOR MEASUREMENT CORRECTIONS

(75) Inventor: Yun Xiao, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/466,862

(22) Filed: Nov. 3, 2006

(51) Int. Cl.
*F02D 41/18* (2006.01)
*G06F 15/48* (2006.01)
*F02D 41/14* (2006.01)

(52) U.S. Cl. ........................ 701/103; 60/602; 73/118.2

(58) Field of Classification Search ................ 701/103, 701/102, 114; 60/274, 285, 602; 73/117.3, 73/118.2
See application file for complete search history.

(56) References Cited

U.S. PATENT DOCUMENTS 5,070,846 A * 12/1991 Dudek et al. .............. 73/118.2
5,714,683 A * 2/1998 Maloney ..................... 73/118.2
6,363,316 B1 * 3/2002 Soliman et al. ............. 701/104
6,883,318 B2 * 4/2005 Warner et al. ................ 60/602

* cited by examiner

*Primary Examiner*—Hieu T. Vo

(57) ABSTRACT

A mass airflow sensor measurement correction system for a turbocharged diesel engine operating under transient conditions includes a signal input device that generates an engine speed signal based on an engine speed of a turbocharged diesel engine. A control module receives the engine speed signal and calculates a correction value of mass airflow from a differential of the engine speed signal and a constant.

32 Claims, 4 Drawing Sheets

METHOD FOR DYNAMIC MASS AIR FLOW SENSOR MEASUREMENT CORRECTIONS

FIELD OF THE INVENTION

The present invention relates to a mass air flow system of an internal combustion engine, and more particularly to systems and methods for correcting a mass air flow sensor measurement of the system.

BACKGROUND OF THE INVENTION

Mass Air Flow (MAF) can be measured using hotwire or hotfilm anemometer type sensors. These types of sensors are used in engine control systems for gasoline engines and diesel engines. MAF measurements are used to control the proportion of fuel to air in the engine. MAF sensors convert air flowing past a heated sensing element into an electronic signal. The strength of the signal is determined by the energy needed to keep the element at a constant temperature above the incoming ambient air temperature. As the volume and density (mass) of airflow across the heated element changes, the temperature of the element is adjusted to maintain the desired temperature of the heating element. The varying current flow parallels the particular characteristics of the incoming air (hot, cold, dry, humid, high/low pressure). A control module monitors the changes in current to determine air mass and to calculate precise fuel requirements.

During transient engine operations, MAF sensor reading delays, or phase shifts can adversely affect control of the air fuel ratio, engine smoke control systems, and exhaust gas recirculation (EGR) systems. Many attempts have been made to overcome the transient delay of MAF sensor readings. One approach applies digital averaging software and filtering functions to artificially shift MAF sensor signals. Another method applies a manifold volume filling model.

These methods were developed to correct MAF sensor over predictions of fresh air mass per cylinder. The methods do not correct severe under predictions of fresh air mass per cylinder. Under predictions can occur during transient operations of the engine. An under prediction of air flow can severely penalize the vehicles driveability. The methods also fail to take into account engine speed change effects. The methods are not applicable to initial vehicle launch conditions of a diesel engine with a turbocharger where manifold pressure changes are small due to turbo lag, but rapid changes in engine speed are present.

Speed-density calculations or multi-zoned Dyna-Air algorithms are also used instead of MAF sensors. These methods can be complicated and require the availability of large sets of test data.

SUMMARY OF THE INVENTION

Accordingly, a mass airflow sensor measurement correction system for a turbocharged diesel engine operating under transient conditions includes a signal input device that generates an engine speed signal based on an engine speed of a turbocharged diesel engine. A control module receives the engine speed signal and calculates a correction value of mass airflow from a differential of the engine speed signal and a constant.

In other features, the constant is determined from at least one of a displacement volume of the engine, a volumetric efficiency of the engine, a temperature of an intake manifold, and a gas constant. The constant can be adjusted based on delays of the signal input device and delays of control module processing.

In another feature, the control module determines a differential of the engine speed signal and calculates a correction value from the constant and the differential according to the following equation:

$$\frac{dMAF}{dt} = K_1 \frac{dRPM}{dt}.$$

In another feature, the mass airflow sensor measurement correction system includes a second signal input device that generates a manifold absolute pressure signal based on a pressure of an intake manifold coupled to the engine. The control module receives the manifold absolute pressure signal and calculates a correction value of mass airflow from the engine speed signal, the manifold absolute pressure signal, and the constant according to the following equation:

$$\frac{dMAF}{d} = K_1\left[RPM\left(\frac{dMAP}{dt}\right) + MAP\left(\frac{dRPM}{dt}\right)\right].$$

In still other features, the control module determines a differential of the engine speed signal, determines a differential of the manifold absolute pressure signal, and calculates a correction value based on the differential of the engine speed, the differential of the manifold absolute pressure signal, the constant and a second constant according to the following equation:

$$\frac{dMAF}{dt} = K_1 \frac{dRPM}{dt} + K_2 \frac{dMAP}{dt}.$$

In yet another feature, the control module determines a differential of the manifold absolute pressure signal and calculates the correction value based on the differential of the manifold absolute pressure signal and the first constant according to the following equation:

$$\frac{dMAF}{dt} = K_1 \frac{dMAP}{dt}.$$

In yet another feature, the control module determines a mass airflow per cylinder value from the correction value. The control module controls a fuel injector of the engine based on the mass airflow per cylinder value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
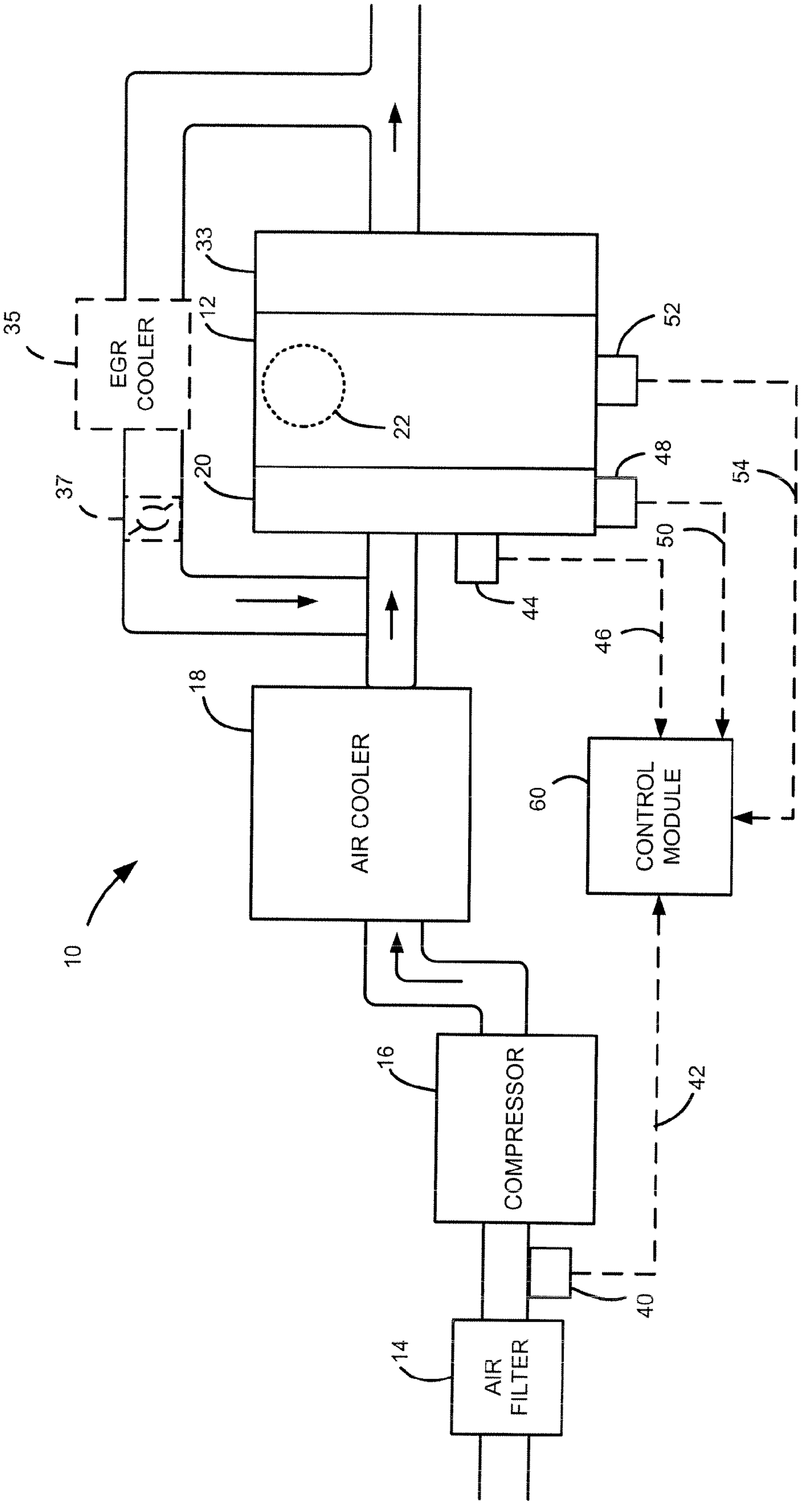
FIG. 1 is a functional block diagram illustrating a turbocharged diesel engine system.

The following description of the preferred embodiment(s) is merely exemplary in nature and is in no way intended to limit the invention, its application, or uses. For purposes of clarity, the same reference numbers will be used in the drawings to identify the same elements. As used herein, the term module and/or device refers to an application specific integrated circuit (ASIC), an electronic circuit, a processor (shared, dedicated, or group) and memory that execute one or more software or firmware programs a combinational logic circuit and/or other suitable components that provide the described functionality.

Referring now to FIG. 1, a turbocharged diesel engine system 10 includes an engine 12 that combusts an air and fuel mixture to produce drive torque. Air enters the system by passing through an air filter 14. After passing through the air filter, air is drawn into a compressor 16. The compressor 16 compresses the air entering the system 10. The greater the compression of the air generally, the greater the output of the engine 12. Compressed air then passes through an air cooler 18 before entering into an intake manifold 20. Cooling the air makes the air denser. The air cooler 18 then releases the air into an intake manifold 20. Air within the intake manifold 20 is distributed into cylinders 22. Although a single cylinder 22 is illustrated, it can be appreciated that the dynamic mass airflow measurement correction system of the present invention can be implemented in engines having a plurality of cylinders including, but not limited to, 2, 3, 4, 5, 6, 8, 10 and 12 cylinders.

Figure 2:
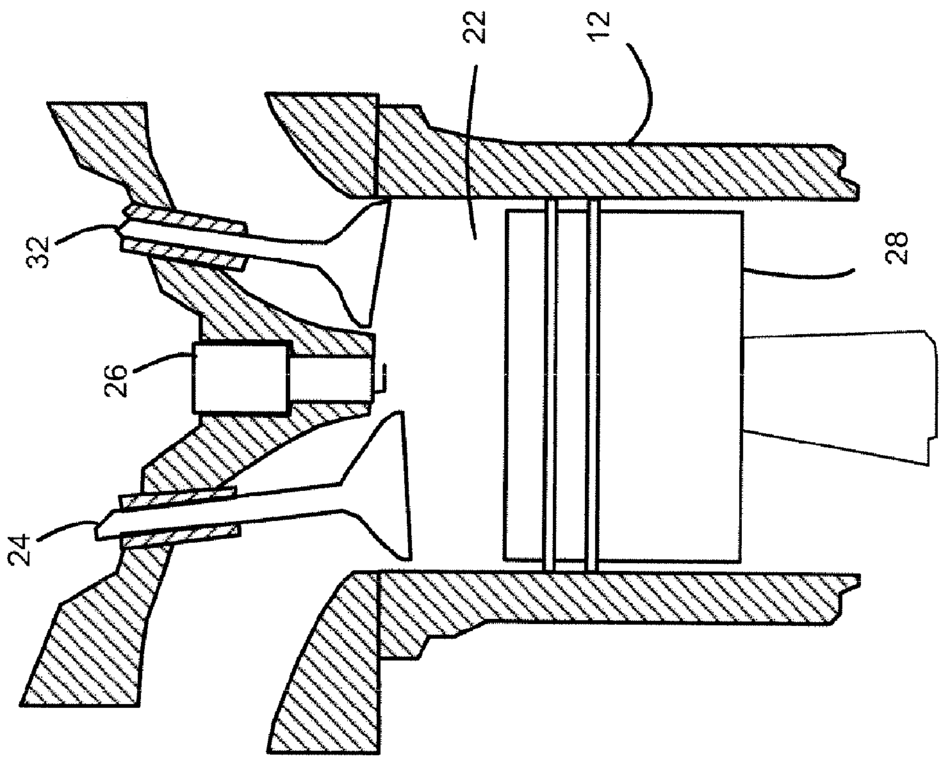
FIG. 2 is a cross sectional view of a cylinder of a diesel engine.
Figure 3:
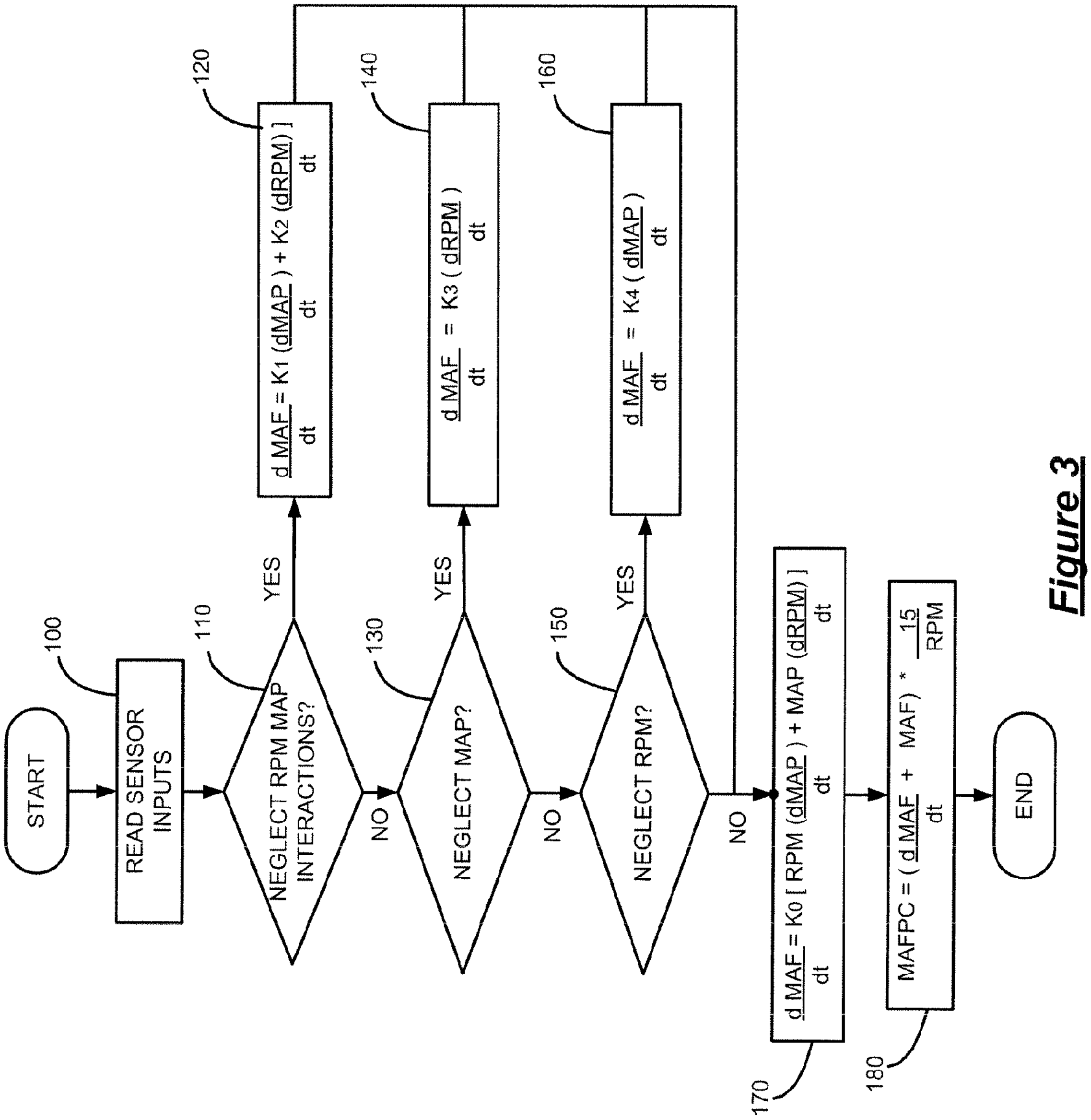
FIG. 3 is a flowchart illustrating the steps of a method executed by a control module of the engine system that calculates a MAF sensor correction value.

Referring now to FIG. 2, an intake valve 24 of the engine selectively opens and closes to enable the air to enter the cylinder 22. The intake valve position is regulated by an intake camshaft (not shown). A fuel injector 26 simultaneously injects fuel into the cylinder 22. The fuel injector 26 is controlled to provide a desired air-to-fuel (A/F) ratio within the cylinder 22. A piston 28 compresses the A/F mixture within the cylinder 22. The compression of the hot air ignites the fuel in the cylinder 22, which drives the piston 28. The piston 28, in turn, drives a crankshaft 30 to produce drive torque. Combustion exhaust within the cylinder 22 is forced out an exhaust port when an exhaust valve 32 is in an open position. The exhaust valve position is regulated by an exhaust camshaft (not shown). Although single intake and exhaust valves 24, 32 are illustrated, it can be appreciated that the engine 12 can include multiple intake and exhaust valves 24, 32 per cylinder 22.

Referring back to FIG. 1, combustion exhaust within the cylinder is forced out of the exhaust port into an exhaust manifold 33. Whereupon, exhaust can be returned to the intake manifold 20 and/or treated in an exhaust system (not shown) and released to the atmosphere. In an alternative embodiment, an exhaust gas recirculation (EGR) system (shown in phantom) can also be included in the system. The EGR system includes an EGR cooler 35 and an EGR valve 37 that regulates exhaust flow back into the intake manifold 20. The mass of exhaust air that is recirculated back into the intake manifold 20 also reduces the combustion temperature in the engine cylinder, and affects engine torque output.

A mass airflow (MAF) sensor 40 senses the mass of the intake airflow and generates a MAF signal 42. An intake manifold temperature (IMT) sensor 44 senses a temperature of the intake manifold and generates an intake manifold temperature signal 46. A manifold absolute pressure (MAP) sensor 48 senses the pressure within the intake manifold 20 and generates a MAP signal 50. An engine speed sensor 52 senses a rotational speed of the crankshaft 30 of the engine 12 and generates an engine speed signal 54 in revolutions per minute (RPM).

A control module 60 receives the above mentioned signals 42, 46, 50, and 54. The control module 60 controls the engine system 10 based on an interpretation of the signals and the mass airflow sensor correction method of the present invention. More specifically, the control module 60 interprets the signals and calculates a mass airflow correction value from the signals during transient engine operations using fundamental engine airflow physics. The correction value is then applied to an air per cylinder calculation. An air per cylinder value is then used to control the fuel injector 26 of the cylinder 22. The air per cylinder value can also be used to control the EGR system and/or a smoke control system (not shown).

A description of the mass airflow sensor correction method follows. Real engine airflow verses theoretical airflow for a four stroke engine can be related with the volumetric efficiency $\eta_v$ of the engine by the following equation:

$$\eta_v = \frac{MAF}{\rho_{charge}\left(\frac{V_{disp}}{2}\right) * \left(\frac{RPM}{60}\right)}$$

simplified as $$\eta_v = \frac{MAF}{\left(\frac{1}{120}\right)\rho_{charge} * V_{disp} * RPM}.$$

Where, MAF is the mass air flow of the system in grams per second. The control module 60 determines this value from the MAF signal 42. $V_{disp}$ is the engine displacement volume in liters. $V_{disp}$ can vary according to the size and number of cylinders 22 of the engine 12. Dividing $V_{disp}$ by two calculates the actual displacement of a cylinder 22 for a four stroke engine operating with two revolutions per cycle. RPM is the engine speed in revolutions per minute. The control module 60 determines this value from the engine speed signal 52. Dividing by sixty converts the equation to seconds.

$\rho_{charge}$ is the charge density of the air in kilograms per meters cubed. The control module 60 calculates $\rho_{charge}$ from the following equation:

$$\rho_{charge} = \left(\frac{MAP}{R_{charge} \cdot IMT}\right).$$

Where, MAP is the intake manifold absolute pressure in kilopascals determined from the MAP signal 48. $R_{charge}$ is a gas constant and IMT is the intake manifold temperature in Kelvin determined from the IMT signal 44.

To clarify mass airflow dependency on the inputs, the equation can be arranged into an explicit form:

$$MAF = \eta_v\left(\frac{1}{120}\right)V_{disp}\left(\frac{MAP}{R_{charge}\cdot IMT}\right)\text{RPM}.$$

In the above relation, engine displacement volume $V_{disp}$ and gas $R_{charge}$ are nearly constant. $\eta_v$ is the volumetric efficiency that measures how well a cylinder 22 is breathing. The variation of $\eta_v$ can be moderate, ranging from ten to twenty percent. The variation of IMT can also be moderate, averaging near twenty percent in some cases. The parameters with large variations in value are RPM and MAP. RPM and MAP can experience percentage changes as large as two hundred to three hundred percent. For example, an RPM range can be from 600 RPM at idle to a high of 3200. A MAP range can be from nearly 100 kPa at idle for operation at sea level to a high of 275 kPa. While exemplary ranges are disclosed, other values may be used.

By grouping small variation parameters into a constant K, the major changes in MAF can be predicted from changes in RPM and MAP by the following equation:

$$\frac{dMAF}{dt} = K\left[\text{RPM}\left(\frac{dMAF}{dt}\right) + MAP\left(\frac{dMAF}{dt}\right)\right].$$

The constant K can be selectable based on the displacement volume, manifold temperature, gas constant and volumetric efficiency of the system. The constant can also take into account system delays from sensor readings or controller processing and/or time differences due to varying lengths and volumes of the components of the engine system 10.

Referring now to FIG. 2, steps executed by the control module according to the MAF sensor correction method is shown. Control interprets signals from sensors of the system in step 100. The interpreted signals are used in a calculation of a differential of MAF. In step 110, control may choose to neglect interactions between RPM and MAP and calculate a MAF differential in step 120 from a constant $K_1$, an RPM, a constant $K_2$, a MAP differential, and an RPM differential. The constants $K_1$ and $K_2$ can be selectable. The relation can be illustrated by the following equation:

$$\frac{dMAF}{dt} = K_1\frac{dMAP}{dt} + K_2\frac{d\text{RPM}}{dt}.$$

Otherwise, in step 130, control may choose to neglect the MAP signal and calculate a MAF differential in step 140 from a constant $K_3$ and an RPM differential. The constant $K_3$ can be selectable. The following equation shows the relationship:

$$\frac{dMAF}{dt} = K_3\frac{d\text{RPM}}{dt}.$$

Alternatively, in step 150, control may choose to neglect RPM and calculate a MAF differential in step 160 from a constant $K_4$ and a MAP change. The constant $K_4$ can be selectable. The following equation shows the relationship:

$$\frac{dMAF}{dt} = K_4\frac{dMAP}{dt}.$$

Otherwise, control calculates a MAF differential by taking into account interactions between MAP and RPM, an RPM differential, a MAP differential, and a constant $K_0$ in step 170. The constant $K_0$ can be selectable. The following equation shows the relationship:

$$\frac{dMAF}{dt} = K_0\left[\text{RPM}\left(\frac{dMAF}{dt}\right) + MAP\left(\frac{dMAF}{dt}\right)\right].$$

Based on the MAF differential, an air per cylinder value can be calculated. In step 180, control adds the MAF differential to a calculated MAF per cylinder (MAFPC) value. The MAFPC is calculated from the MAF, the RPM and a constant value. The constant value is determined from the number of revolutions per cycle and the number of cylinders per engine. For a four stroke, two revolutions per cycle, eight cylinder engine, the constant value is 15. Where 60 minutes per second is multiplied by 2 revolutions per cycle and divided by 8 cylinders per engine The equation for MAFPC with the constant value 15 is shown as:

$$MAFPC = \left(\frac{dMAF}{dt} + MAF\right) * \frac{15}{\text{RPM}}$$

Figure 4:
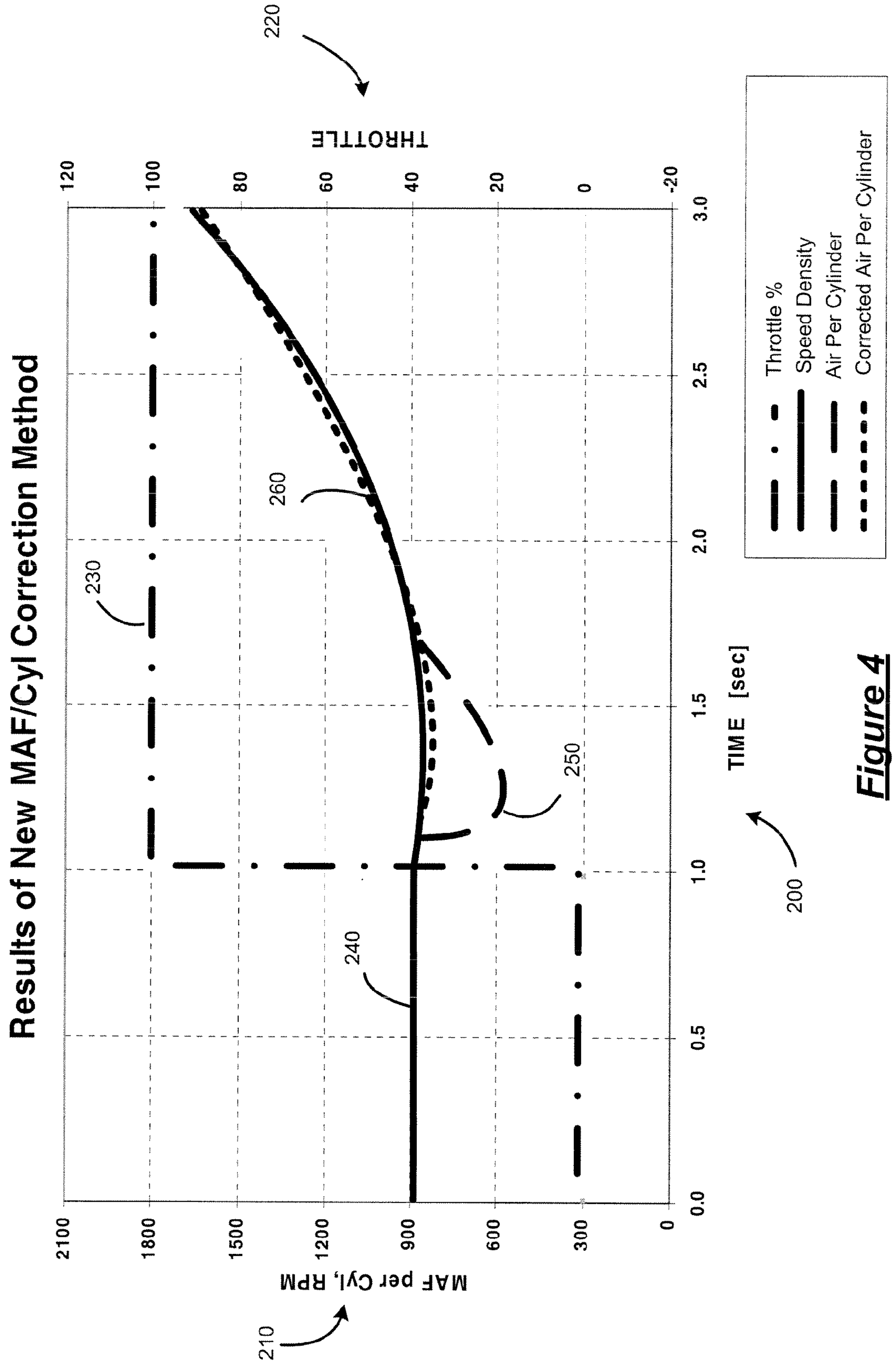
FIG. 4 is a graph illustrating the results of the MAF sensor correction method.

Referring now to FIG. 4, a graph plotting example results of the correction method applied to a four stroke eight cylinder engine is shown. Time of execution in seconds is displayed along the x-axis at 200. MAF per cylinder per RPM is displayed along the left side y-axis at 210. Throttle position in percent is displayed along the right side y-axis at 220. Throttle position values plotted in percent illustrate a transient condition of the engine at 230. Speed density values calculated from traditional regressive test data is shown at 240. MAF per cylinder values without the inclusion of the correction method is shown at 250. The effectiveness of the new MAF per cylinder correction calculation is shown at 260 where the plotted calculated MAF per cylinder value including the correction term nearly matches the values for the traditional speed density calculation.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A mass airflow sensor measurement correction system for a turbocharged diesel engine operating under transient conditions, comprising:

a engine speed signal input device that receives an engine speed signal based on an engine speed of a turbocharged diesel engine; and a control module that receives said engine speed signal and that calculates a correction value of mass airflow from a differential of said engine speed signal and a first constant and that applies said correction value to a measured mass airflow value.

2. The system of claim 1 wherein said first constant is determined from at least one of a displacement volume of said engine, a volumetric efficiency of said engine, a temperature of an intake manifold, and a gas constant.

3. The system of claim 2 wherein said first constant is adjusted based on delays of said signal input device and delays of said control module processing.

4. The system of claim 1 wherein said control module determines said differential of said engine speed signal and calculates said correction value from said first constant and said differential according to the following equation:

$$\frac{dMAF}{dt} = K_1 \frac{dRPM}{dt}.$$

5. The system of claim 1 further comprising a manifold absolute pressure signal input device that receives a manifold absolute pressure signal based on a pressure of an intake manifold coupled to said engine, and wherein said control module is receptive of said manifold absolute pressure signal and is operable to calculate a correction value of mass airflow from said engine speed signal, said manifold absolute pressure signal, and said first constant.

6. The system of claim 5 wherein said control module determines a differential of said engine speed signal, determines a differential of said manifold absolute pressure signal and calculates said correction value based on said engine speed signal, said manifold absolute pressure signal, said differential of said engine speed signal, said differential of said manifold absolute pressure signal, and said first constant according to the following equation:

$$\frac{dMAF}{dt} = K_1 \left[ RPM\left(\frac{dMAP}{dt}\right) + MAP\left(\frac{d\mathrm{RPM}}{dt}\right) \right].$$

7. The system of claim 5 wherein said control module determines a differential of said engine speed signal, determines a differential of said manifold absolute pressure signal, and calculates said correction value based on said differential of said engine speed, said differential of said manifold absolute pressure signal, said first constant, and a second constant according to the following equation:

$$\frac{dMAF}{dt} = K_1 \frac{d\mathrm{RPM}}{dt} + K_2 \frac{dMAP}{dt}.$$

8. The system of claim 7 wherein said second constant is determined from at least one of a displacement volume of said engine, a volumetric efficiency of said engine, a temperature of an intake manifold, and a gas constant.

9. The system of claim 8 wherein said second constant is adjusted based on delays of said signal input device and delays of control module processing.

10. The system of claim 1 further comprising a manifold absolute pressure signal input device that receives a manifold absolute pressure signal based on an air pressure of an intake manifold, and wherein said control module is receptive of said manifold absolute pressure signal and is operable to calculate said correction value of mass airflow from said manifold absolute pressure signal and said first constant.

11. The system of claim 10 wherein said control module determines a differential of said manifold absolute pressure signal and calculates said correction value based on said differential of said manifold absolute pressure signal and said first constant according to the following equation:

$$\frac{dMAF}{dt} = K_1 \frac{dMAP}{dt}.$$

12. The system of claim 1 wherein said control module determines a mass airflow per cylinder value from said correction value.

13. The system of claim 12 wherein said control module controls a fuel injector of said engine based on said mass airflow per cylinder value.

14. A method of correcting a mass airflow sensor measurement of an engine operating under transient conditions, comprising:

detecting a speed of an engine;

determining a first differential of said speed of said engine; and calculating a value for a mass airflow sensor measurement based on said first differential of said speed and a first constant.

15. The method of claim 14 further comprising selecting a first constant based on at least one of a displacement volume of said engine, a volumetric efficiency of said engine, a temperature of an intake manifold, and a gas constant.

16. The method of claim 14 wherein said step of calculating is based on the following equation:

$$\frac{dMAF}{dt} = K_1 \frac{d\mathrm{RPM}}{dt}.$$

17. The method of claim 14 further comprising:

detecting an air pressure form an intake manifold of said engine;

determining a second differential of said air pressure of said manifold; and wherein said step of calculating is further described as calculating a correction value based on said first differential of said speed, said first constant, said second differential of said air pressure, and a second constant.

18. The method of claim 17 wherein said step of calculating is based on the following equation:

$$\frac{dMAF}{dt} = K_1 \frac{d\mathrm{RPM}}{dt} + K_2 \frac{dMAP}{dt}.$$

19. The method of claim 17 further comprising selecting a second constant based on at least one of a displacement volume of said engine, a volumetric efficiency of said engine, a temperature of an intake manifold, and a gas constant.

20. The method of claim 17 wherein said step of calculating is further described as calculating a correction value based on said speed of said engine, said first differential of said speed, said first constant, said air pressure, and said second differential of said air pressure.

21. The method of claim 20 wherein said step of calculating is based on the following equation:

$$\frac{dMAF}{dt} = K_1\left[\text{RPM}\left(\frac{dMAP}{dt}\right) + MAP\left(\frac{d\text{RPM}}{dt}\right)\right].$$

22. The method of claim 14 further comprising calculating a mass airflow per cylinder value based on said correction value.

23. The method of claim 22 further comprising controlling fuel of said engine based on said mass airflow per cylinder value.

24. The method of claim 22 further comprising controlling an exhaust gas recirculation system of said engine based on said mass airflow per cylinder value.

25. The method of claim 22 further comprising controlling a smoke control system based on said mass airflow per cylinder value.

26. A method of correcting a mass air flow sensor measurement of an engine system with an intake manifold, comprising:

detecting an air pressure of a manifold;

determining a first differential of said air pressure; and calculating a correction value for a mass airflow sensor measurement based on said first differential of said air pressure and a first constant.

27. The method of claim 26 further comprising selecting a first constant based on at least one of a displacement volume of said engine, a volumetric efficiency of said engine, a temperature of an intake manifold, and a gas constant.

28. The method of claim 26 wherein said step of calculating is based on the following equation:

$$\frac{dMAF}{dt} = K_1\frac{dMAF}{dt}.$$

29. The method of claim 26 further comprising calculating a mass airflow per cylinder value based on said correction value.

30. The method of claim 29 further comprising controlling fuel of said engine based on said mass airflow per cylinder value.

31. The method of claim 29 further comprising controlling an exhaust gas recirculation system based on said mass airflow per cylinder value.

32. The method of claim 29 further comprising controlling a smoke control system based on said mass airflow per cylinder value.

* * * * *

UNITED STATES PATENT AND TRADEMARK OFFICE

CERTIFICATE OF CORRECTION

PATENT NO. : 7,302,335 B1
APPLICATION NO. : 11/466862
DATED : November 27, 2007
INVENTOR(S) : Yun Xiao It is certified that error appears in the above-identified patent and that said Letters Patent is hereby corrected as shown below:

Col. 5, Line 26, the equation should be

-- $$\frac{dMAF}{dt} = K\left[RPM\left(\frac{dMAP}{dt}\right) + MAP\left(\frac{dRPM}{dt}\right)\right].$$ --

Col. 6, Line 12, the equation should be

-- $$\frac{dMAF}{dt} = K_0\left[RPM\left(\frac{dMAP}{dt}\right) + MAP\left(\frac{dRPM}{dt}\right)\right].$$ --

Signed and Sealed this

Ninth Day of February, 2010

David J. Kappos

*Director of the United States Patent and Trademark Office*